United States Patent
Wang et al.

(10) Patent No.: US 9,829,351 B2
(45) Date of Patent: Nov. 28, 2017

(54) ENCODING DEVICE

(71) Applicant: HIWIN MIKROSYSTEM CORP., Taichung (TW)

(72) Inventors: Yan-Shiang Wang, Taichung (TW); Yi-Shun Huang, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 135 days.

(21) Appl. No.: 15/010,764

(22) Filed: Jan. 29, 2016

(65) Prior Publication Data

US 2017/0219387 A1 Aug. 3, 2017

(51) Int. Cl.
*G01D 5/34* (2006.01)
*G01D 5/347* (2006.01)

(52) U.S. Cl.
CPC ....... *G01D 5/3473* (2013.01); *G01D 5/34715* (2013.01)

(58) Field of Classification Search
CPC ............ G01D 5/3473; G01D 5/34707; G01D 5/34715
USPC ..... 250/231.13, 231.14, 231.18; 33/706, 707
See application file for complete search history.

(56) References Cited

U.S. PATENT DOCUMENTS

2014/0120802 A1* 5/2014 Duescher .............. B24B 37/005
451/6

* cited by examiner

*Primary Examiner* — Kevin Pyo
(74) *Attorney, Agent, or Firm* — Guice Patents PLLC

(57) ABSTRACT

An encoding device includes a sensing unit having a signal transmitting element and a signal receiving element. The signal transmitting element and the signal receiving element are respectively disposed on different carrier members. Accordingly, when performing the rectification and alignment processes between the signal receiving element and the signal unit, the other components are prevented from hindering the rectification and alignment processes, whereby the rectification and alignment processes can be easily performed.

10 Claims, 5 Drawing Sheets

ENCODING DEVICE

BACKGROUND OF THE INVENTION

1. Field of the Invention

The present invention relates generally to a sensing technique, and more particularly to an encoding device.

2. Description of the Related Art

A conventional sensing unit is used to detect the variation of the light, magnetic field or electrical field of a signal unit so as to measure the geometrical displacement of a mechanism. The obtained analog signals are converted into digital signals by an encoder, which is an inevitable component for achieving precise control in the field of precision mechanical technique. However, in order to provide precise displacement signals, as a precondition, the sensing unit and the signal unit of the encoder must be securely and precisely positioned in the relative positions so as to ensure that the signals are truly detected.

With a conventional encoder for optically detecting the rotational motion taken as an example, the signal unit is synchronously rotated with the rotary shaft. In addition, the signal transmitting end and the signal receiving end of the sensing unit are positioned on two sides of the signal unit in fixed positions opposite to each other so as to perform the measurement of the geometrical displacement. In such conventional technique, the signal unit and the sensing unit are disposed on suitable carrier members and previously located in the true relative positions, whereby by means of the carrier members, the signal unit can be indirectly synchronously rotated with the rotary shaft. Alternatively, the signal unit can be directly coupled on the rotary shaft and then the sensing unit is disposed to perform the rectification and alignment processes thereto.

In the conventional technique that the signal unit is directly coupled on the rotary shaft, when assembled, it is necessary to respectively perform the rectification and alignment processes between the sensing unit and the signal unit. To speak more specifically, when performing the rectification and alignment processes, it is necessary to externally connect the encoder to an oscilloscope for showing the waveform as the basis for the judgment of the rectification. Only when the waveform changes to meet a predetermined specification due to the adjustment of the position, the rectification and alignment processes are completed. Such procedure is quite complicated and will lead to inconvenience in manufacturing, assembling and processing processes. As a result, the manufacturing efficiency can be hardly enhanced.

SUMMARY OF THE INVENTION

It is therefore a primary object of the present invention to provide an encoding device includes a sensing unit and a signal unit. The sensing unit has a signal receiving end. The alignment process between the signal receiving end and the signal unit can be conveniently performed so that the manufacturing, assembling and processing processes of the encoding device are simplified and the manufacturing efficiency is enhanced.

To achieve the above and other objects, the encoding device of the present invention includes a sensing unit having a signal transmitting element and a signal receiving element. The signal transmitting element and the signal receiving element are respectively disposed on different carrier members connected with each other by a flexible electrical connection member. Accordingly, the assembling steps can be performed at different times. When assembled, the components necessitating alignment are first assembled. After the rectification and alignment processes are completed, the other components are then assembled. Therefore, when performing the rectification and alignment processes to the first assembled components, the other components will not obstruct the rectification and alignment processes. In this case, an operator can complete the rectification and alignment processes simply by visual judgment.

More specifically, the encoding device includes a sensing unit and a signal unit.

The sensing unit includes a first carrier member adjacently located on an external motional mechanism, a second carrier member located and spaced from the first carrier member, a signal transmitting element disposed on the second carrier member for generating signals, a signal receiving element disposed on the first carrier member and spaced from the signal transmitting element in alignment therewith for detecting the signals transmitted from the signal transmitting element, and an electrical connection element bridged between the first carrier member and the second carrier member.

The signal unit is positioned between the signal transmitting element and the signal receiving element and synchronously movable with the external motional mechanism, whereby the signal unit provides predetermined signals detected by the signal receiving element in accordance with the displacement of the external motional mechanism.

In addition, in order to enable an operator to more conveniently perform the rectification and alignment processes by visual identification, the encoding device further includes two alignment elements corresponding to each other. The two alignment elements are respectively disposed on the signal receiving element and the signal unit. In general, the alignment elements are preferably alignment marks visually distinguishable. For example, the alignment elements can be points, lines or any other geometrical marks.

The above encoding device can employ the conventional photoelectrical encoding sensing technique to detect the rotational displacement of an external electrical mechanism. Accordingly, the signal transmitting element is a light source, the signal receiving element is a photocell, and the signal unit is an encoding circular disc with a certain encoding form. The encoding form of the signal unit is not limited. In the case that the signal unit is an encoding circular disc, the alignment mark disposed on the signal unit can be a circular line, and the alignment mark disposed on the signal receiving element can be an arched line. In order to facilitate the rectification and alignment processes, the curvature of the circular line is preferably equal to the curvature of the arched line.

When the above encoding device is used to detect the rotational displacement of the external electrical mechanism, the signal unit in the form of a circular disc is directly coaxially coupled on the rotary shaft. The first carrier member is located and positioned on one side of the circular disc of the signal unit. In order to conveniently assemble the first carrier member, the first carrier member is a plate with a U-shaped inner periphery. Under such circumstance, the rotary shaft can be received in the U-shaped opening of the first carrier member. In this case, the signal receiving element disposed on the first carrier member is adjacent to the signal unit.

In addition, in order to prevent the second carrier member from hindering the rectification and alignment processes between the signal receiving element and the signal unit, the electrical connection member is flexible, whereby the position of the second carrier member can be easily adjusted.

Moreover, in order to facilitate the assembling process, the encoding device further includes a spacer element bridged between the first carrier member and the second carrier member so as to keep the second carrier member spaced from the first carrier member with a fixed distance.

The spacer element includes at least one spacer positioned between the first carrier member and the second carrier member and at least one connection member for connecting the spacer with the second carrier member so as to keep the gap.

The present invention can be best understood through the following description and accompanying drawings, wherein:

DETAILED DESCRIPTION OF THE PREFERRED EMBODIMENTS

Figure 1:
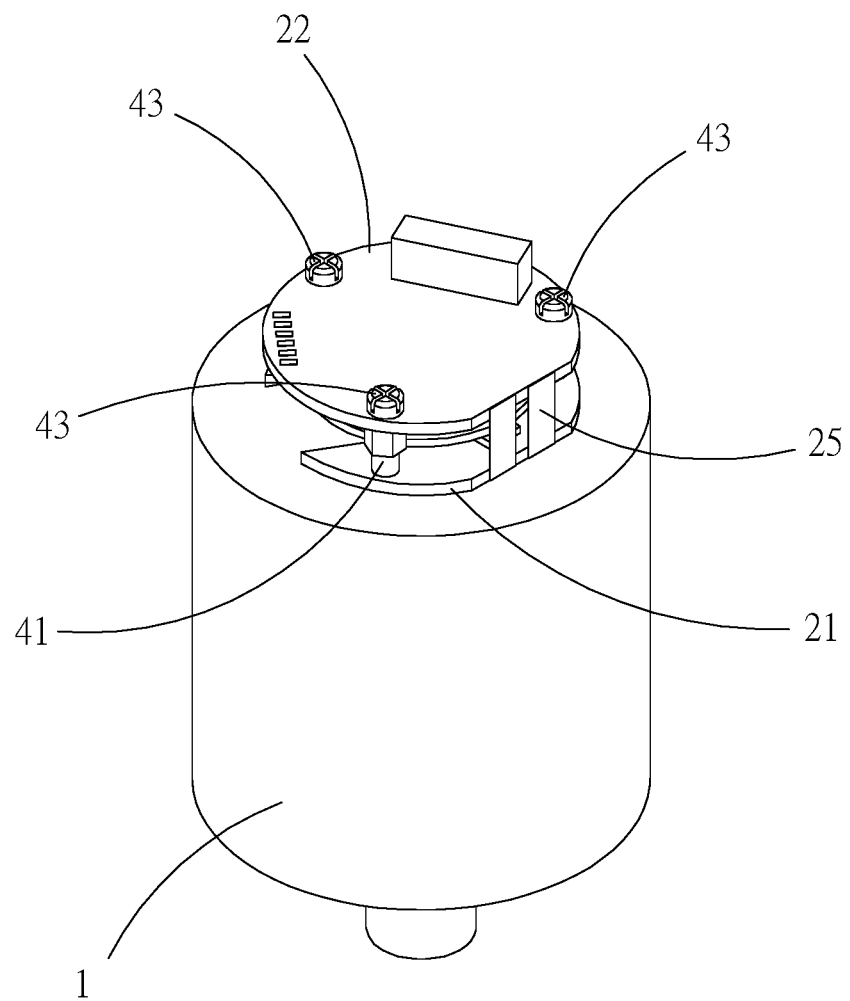
FIG. 1 is a perspective assembled view of an embodiment of the present invention.
Figure 2:
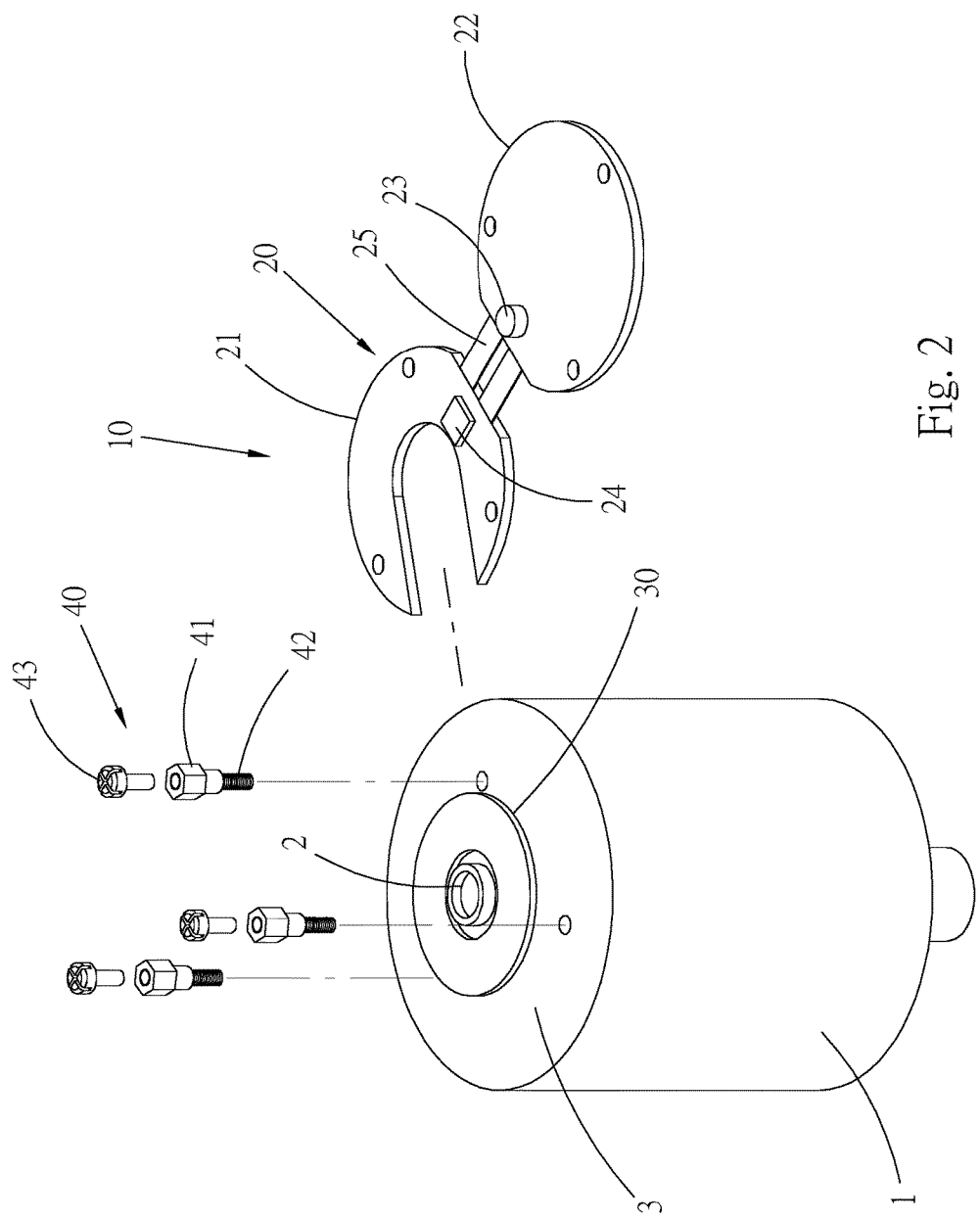
FIG. 2 is a perspective exploded view of the embodiment of the present invention.

Please refer to FIGS. 1 and 2. According to an embodiment, the encoding device 10 of the present invention employs the conventional photoelectrical encoding sensing technique to detect the rotational displacement of the rotary shaft 2 of an external electrical mechanism 1. The encoding device 10 mainly includes a sensing unit 20, a signal unit 30 and a spacer element 40.

The sensing unit 20 has a first carrier member 21, which is a circuit board for arranging electronic components thereon. One face of the first carrier member 21 is attached to a rest face 3 of the electrical mechanism 1 in adjacency to the rotary shaft 2. The first carrier member 21 is properly located and fixedly disposed on the electrical mechanism 1. The sensing unit 20 further has a second carrier member 22, which is a circuit board for arranging electronic components thereon as the first carrier member 21. The second carrier member 22 is spaced from the first carrier member 21 and positioned on an outer side of an end of the rotary shaft 2. The second carrier member 22 is located to keep the gap between the second carrier member 22 and the first carrier member 21. A signal transmitting element 23 formed of a light source and a signal receiving element 24 formed of a photocell are respectively electrically connected and disposed on the second carrier member 22 and the first carrier member 21. The optical signal generated by the signal transmitting element 23 is detected by the signal receiving element 24. The sensing unit 20 further has an electrical connection element 25. Two ends of the electrical connection element 25 are bridged between the first carrier member 21 and the second carrier member 22 as a flexible cable. Accordingly, the respective circuits of the first carrier member 21 and the second carrier member 22 can be electrically connected with each other via the electrical connection element 25.

The signal unit 30 is a transparent encoding circular disc. The signal unit 30 is coaxially coupled and fixedly connected on the rotary shaft 2 and positioned between the signal transmitting element 23 and the signal receiving element 24. Accordingly, when the signal unit 30 is synchronously rotated with the rotary shaft 2, the code channels pre-disposed on the signal unit 30 serve to control the optical signal transmitted from the signal transmitting element 23 to pass through and reach the signal receiving element 24 or not.

The spacer element 40 has multiple spacers 41 with fixed height. The spacers 41 substantially have the form of columns and are respectively disposed between the first carrier member 21 and the second carrier member 22. The spacers 41 serve to space the first carrier member 21 and the second carrier member 22 from each other. Multiple connection members 42 in the form of threaded rods respectively outward extend from an axial end of each spacer 41. The connection members 42 are passed through the first carrier member 21 and screwed on the electrical mechanism 1. In addition, multiple bolt-like connection members 43 are respectively screwed with the other axial end of each spacer 41 and securely connected on the second carrier member 22. Accordingly, by means of the connection members 42 in the form of threaded rods and the bolt-like connection members 43, the spacers 41 are kept positioned between the first carrier member 21 and the second carrier member 22 to securely and stably space the first carrier member 21 and the second carrier member 22 from each other with a fixed distance.

Figure 3:
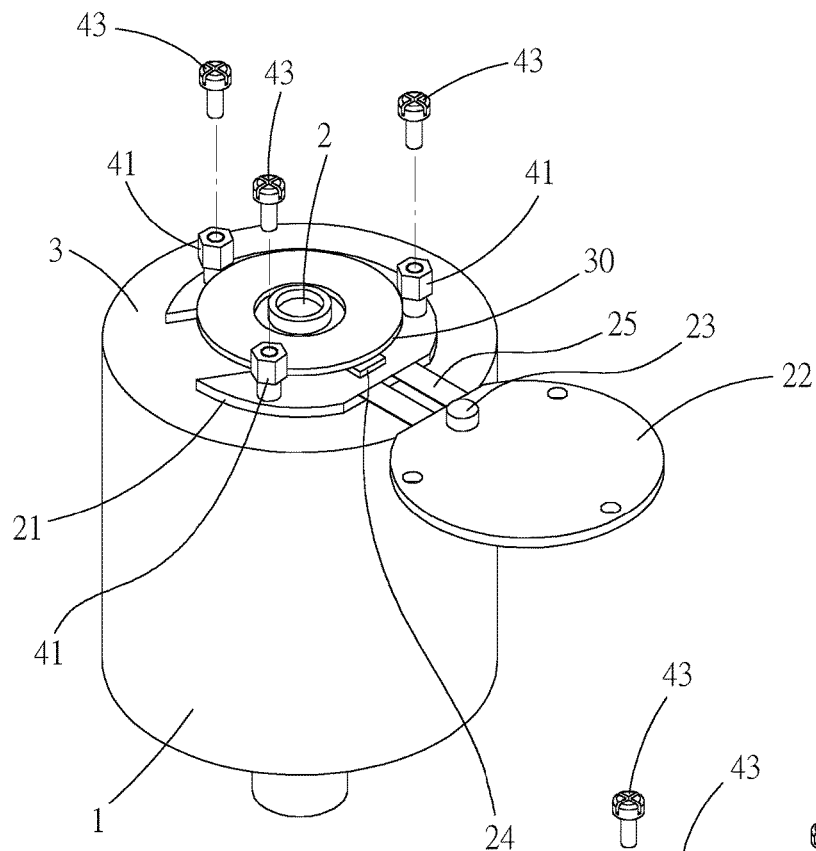
FIG. 3 is a perspective view of the embodiment of the present invention, showing the assembling process thereof in a first state.
Figure 4:
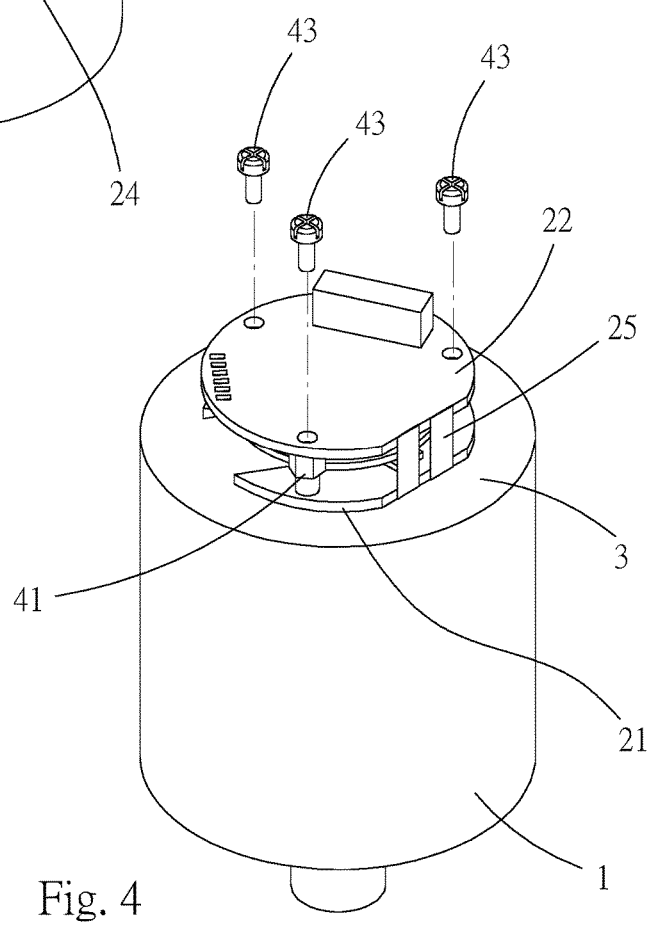
FIG. 4 is a perspective view of the embodiment of the present invention, showing the assembling process thereof in a second state.

Accordingly, in the encoding device 10, the first carrier member 21 and the second carrier member 22 are spaced from each other. When assembled, the alignment components are previously assembled so as to prevent the other components from visually hindering the rectification and alignment processes. To describe the achievement of this effect more specifically, please now refer to FIGS. 3 and 4. As shown in FIG. 3, the signal unit 30 is first directly coaxially coupled on the rotary shaft 2, whereby the signal unit 30 and the rotary shaft 2 can synchronously rotate. Then, the first carrier member 21 is attached to and fixedly disposed on the rest face 3 by means of the connection members 42 in the form of threaded rods. Meanwhile, the second carrier member 22 is still in a free state without being fixed. Also, the second carrier member 22 is only connected to the first carrier member 21 by the electrical connection element 25. Therefore, an operator can adjust the second carrier member 22 to a position to prevent from visually hindering the rectification and alignment. In this case, the rectification and alignment processes of the signal unit 30 and the sensing unit 20 will not be visually obstructed. After the rectification and alignment processes, as shown in FIG. 4, the bolt-like connection members 43 are used to securely dispose the second carrier member 22 on the spacers 41 to complete the assembling process.

In this embodiment, the signal unit 30 is previously fixedly disposed on the electrical mechanism 1 before the first carrier member 21 is mounted. Therefore, in order to successfully insert the first carrier member 21 into the narrow gap between the signal unit 30 and the rest face 3 without being obstructed by the rotary shaft 2, the first carrier member 21 is a plate with a U-shaped inner periphery. Accordingly, the rotary shaft 2 can be received in the U-shaped opening of the first carrier member 21 to facilitate the assembling process.

Figure 5:
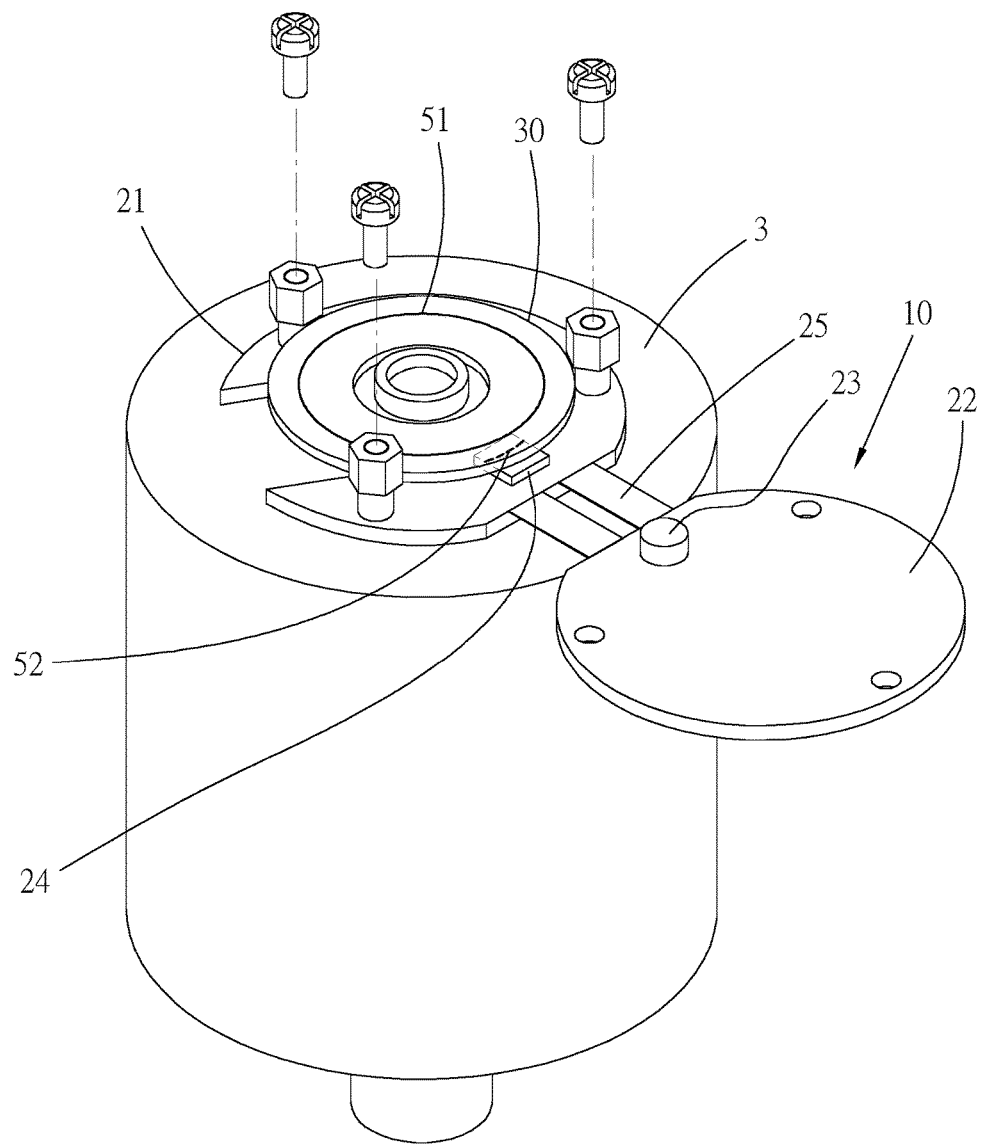
FIG. 5 is a perspective view of the embodiment of the present invention, showing the assembling process thereof in a third state.
Figure 6:
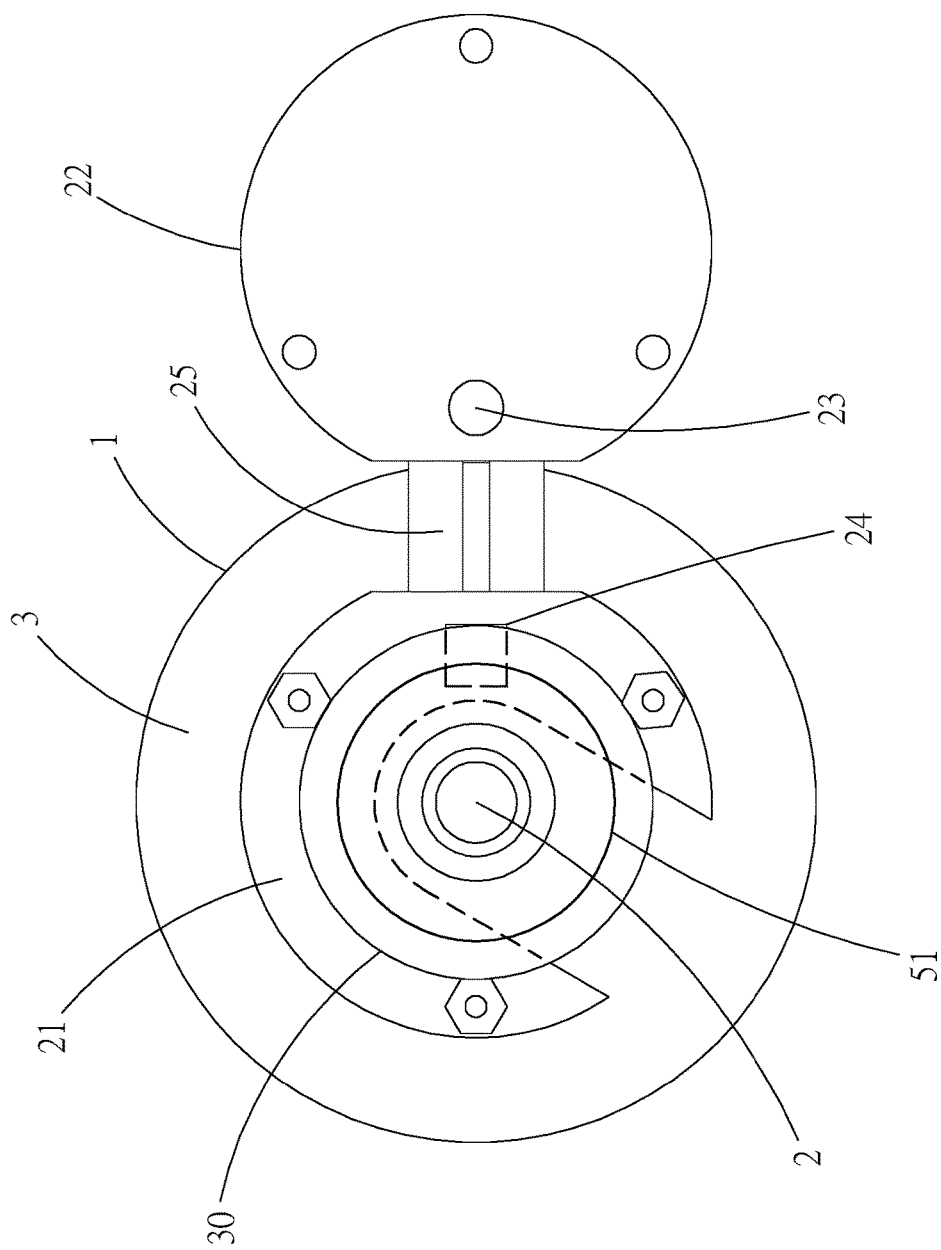
FIG. 6 is a perspective view of the embodiment of the present invention, showing the assembling process thereof in a fourth state.

In addition, in this embodiment, in order to enable the operator to more conveniently perform the rectification and alignment processes by visual identification, as shown in FIGS. 5 and 6, the encoding device 10 further includes two alignment elements 51, 52. The two alignment elements 51, 52 are alignment marks respectively disposed on the signal receiving element 24 and the signal unit 30 as the standards for an operator to perform the alignment process by visual identification. The alignment marks for achieving this effect are not limited to any specific form. The alignment marks can be any marks that can be directly visually identified or indirectly identified by means of microscopic magnification technique. In this embodiment, the mark of the alignment element 51 disposed on the signal unit 30 is a circular line, and the mark of the alignment element 52 disposed on the signal receiving element 24 is an arched line. The curvature of the circular line is equal to the curvature of the arched line. Accordingly, under the assistance of microscopic magnification technique, an operator can quickly rectify and align the signal receiving element 24 with the signal unit 30 simply by visually identification. Therefore, the assembling efficiency can be enhanced. Moreover, the encoding device 10 has a very small volume so that the total volume of the assembly can be minified.

The above embodiments are only used to illustrate the present invention, not intended to limit the scope thereof. Many modifications of the above embodiments can be made without departing from the spirit of the present invention.

What is claimed is:

1. An encoding device for detecting geometrical displacement of external motional mechanism, the encoding device comprising:
    a sensing unit, including a first carrier member adjacently located on the external motional mechanism, a second carrier member located and spaced from the first carrier member, a signal transmitting element disposed on the second carrier member for generating signals, a signal receiving element disposed on the first carrier member and spaced from the signal transmitting element in alignment therewith for detecting the signals transmitted from the signal transmitting element, and an electrical connection element bridged between the first carrier member and the second carrier member; and
    a signal unit positioned between the signal transmitting element and the signal receiving element and synchronously movable with the external motional mechanism, whereby the signal unit provides predetermined signals detected by the signal receiving element in accordance with the displacement of the external motional mechanism.

2. The encoding device as claimed in claim 1, further comprising two alignment elements respectively disposed on the signal receiving element and the signal unit.

3. The encoding device as claimed in claim 2, wherein the two alignment elements are alignment marks.

4. The encoding device as claimed in claim 3, wherein the alignment mark disposed on the signal unit is a circular line, and the alignment mark disposed on the signal receiving element is an arched line, wherein the curvature of the circular line is equal to the curvature of the arched line.

5. The encoding device as claimed in claim 1, wherein the signal transmitting element is a light source, the signal receiving element is a photocell, and the signal unit is an encoding circular disc.

6. The encoding device as claimed in claim 1, wherein the first carrier member is a plate with a U-shaped inner periphery.

7. The encoding device as claimed in claim 1, wherein the first carrier member and the second carrier member are circuit boards.

8. The encoding device as claimed in claim 7, wherein the electrical connection element is a flexible cable.

9. The encoding device as claimed in claim 1, further comprising a spacer element securely disposed between the first carrier member and the second carrier member so as to keep the second carrier member spaced from the first carrier member with a fixed distance.

10. The encoding device as claimed in claim 9, wherein the spacer element includes at least one spacer positioned between the first carrier member and the second carrier member and at least one connection member for connecting the spacer with the second carrier member.

\* \* \* \* \*